(12) United States Patent
Chen et al.

(10) Patent No.: US 7,031,150 B2
(45) Date of Patent: Apr. 18, 2006

(54) MOUNTING APPARATUS FOR DATA STORAGE DEVICE

(75) Inventors: Yun Lung Chen, Tu-Chen (TW); Chuan Min Shi, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 2 days.

(21) Appl. No.: 10/940,279

(22) Filed: Sep. 13, 2004

(65) Prior Publication Data

US 2005/0057895 A1    Mar. 17, 2005

(30) Foreign Application Priority Data

Sep. 12, 2003  (TW) .............................. 92216488 U

(51) Int. Cl.
*G06F 1/16* (2006.01)

(52) U.S. Cl. ................... 361/685; 439/638; 248/611

(58) Field of Classification Search ........ 361/679–687, 361/724–727; 439/638; 312/223.1–223.2; 369/75.1; 248/611, 615
See application file for complete search history.

(56) References Cited

U.S. PATENT DOCUMENTS 6,304,457 B1   10/2001   Liu et al.
6,590,775 B1 * 7/2003   Chen ........................... 361/725
6,600,648 B1 * 7/2003   Curlee et al. ................ 361/685
6,775,132 B1 * 8/2004   Chen et al. .................. 361/685
6,882,526 B1 * 4/2005   Neukam et al. ............ 361/685

FOREIGN PATENT DOCUMENTS

TW            81207129           9/1992

* cited by examiner

Primary Examiner—Hung Van Duong
(74) Attorney, Agent, or Firm—Wei Te Chung

(57) ABSTRACT

A mounting apparatus for mounting a data storage device (10) to a chassis (20), includes a drive bracket (30), a support bracket (40) received in the drive bracket and a latch (50) attached to a side wall (34) of the drive bracket. A plurality of slots (341, 342) is defined in both side walls of the drive bracket. Each slot communicates with an upper edge of the side wall via an entry. The support bracket includes a base (42) and a pair of side plates (44) for receiving the data storage device therebetween. A plurality of pins (442) extends outwardly from the side plates for slideably engaging in the slots of the drive bracket. The latch has a main body (51) and a resilient fastening portion (53). The fastening portion removably engages with the corresponding pin therefore securing the data storage device in the drive bracket.

17 Claims, 4 Drawing Sheets

MOUNTING APPARATUS FOR DATA STORAGE DEVICE

BACKGROUND OF THE INVENTION

1. Field of the Invention

The present invention relates to mounting apparatuses for data storage devices, and particularly to a mounting apparatuses for readily attaching a data storage device to a computer enclosure.

2. Description of the Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. Examples are disclosed in Taiwan Patent Application No. 81207129 and U.S. Pat. No. 6,304,457. Fixing a data storage device to a drive bracket with bolts is unduly laborious and time-consuming. Furthermore, the computer enclosure needs extra operating space for carrying out the fixing operation. Fixing a data storage device in a drive bracket using rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance because of the plastic rails easily wearing out and needing replacement.

Thus, a mounting apparatus for a data storage device which solves the above-mentioned problems is strongly desired.

SUMMARY OF THE INVENTION

Accordingly, an object of the present invention is to provide a mounting apparatus with a simple structure which readily allows attachment and removal of a data storage device to and from a chassis.

Another object of the present invention is to provide a mounting apparatus which is configured to be good at grounding and anti-vibration.

To achieve the above-mentioned object, a mounting apparatus in accordance with the preferred embodiment of the present invention is used to mount a data storage device in a computer chassis. The mounting apparatus comprises a drive bracket, a support bracket received in the drive bracket and a latch attached to a side wall of the drive bracket. A plurality of slots is defined in both side walls of the drive bracket. Each slot communicates with an upper edge of the side wall via an entry. The support bracket comprises a base and a pair of side plates. A plurality of positioning tabs formed inwardly from the support bracket to engage with the data storage device. A plurality of resilient members extends slightly outwardly from the support bracket to abut against the drive bracket for better grounding and anti-vibration. A plurality of pins extends outwardly from the side plates for slideably engaging in the slots of the drive bracket. The latch has a main body and a resilient fastening portion. The fastening portion removably engages with the corresponding pin therefore securing the data storage device in the drive bracket. When pressing a handle of the latch, the fastening portion will be driven to release the pin.

In this invention, the support bracket is received in the drive bracket with the pins slid in the slots, and by means of the latch attached to the drive bracket to secure one of the pins, so that the combined data storage device and support bracket is attached to the drive bracket. That is to say, the data storage device is secured to the drive bracket without screws, therefore simplifies the attachment and removal procedures.

Other objects, advantages and novel features of the present invention will be drawn from the following detailed description of a preferred embodiment of the present invention with attached drawings, in which:

DETAILED DESCRIPTION OF THE INVENTION

Figure 1:
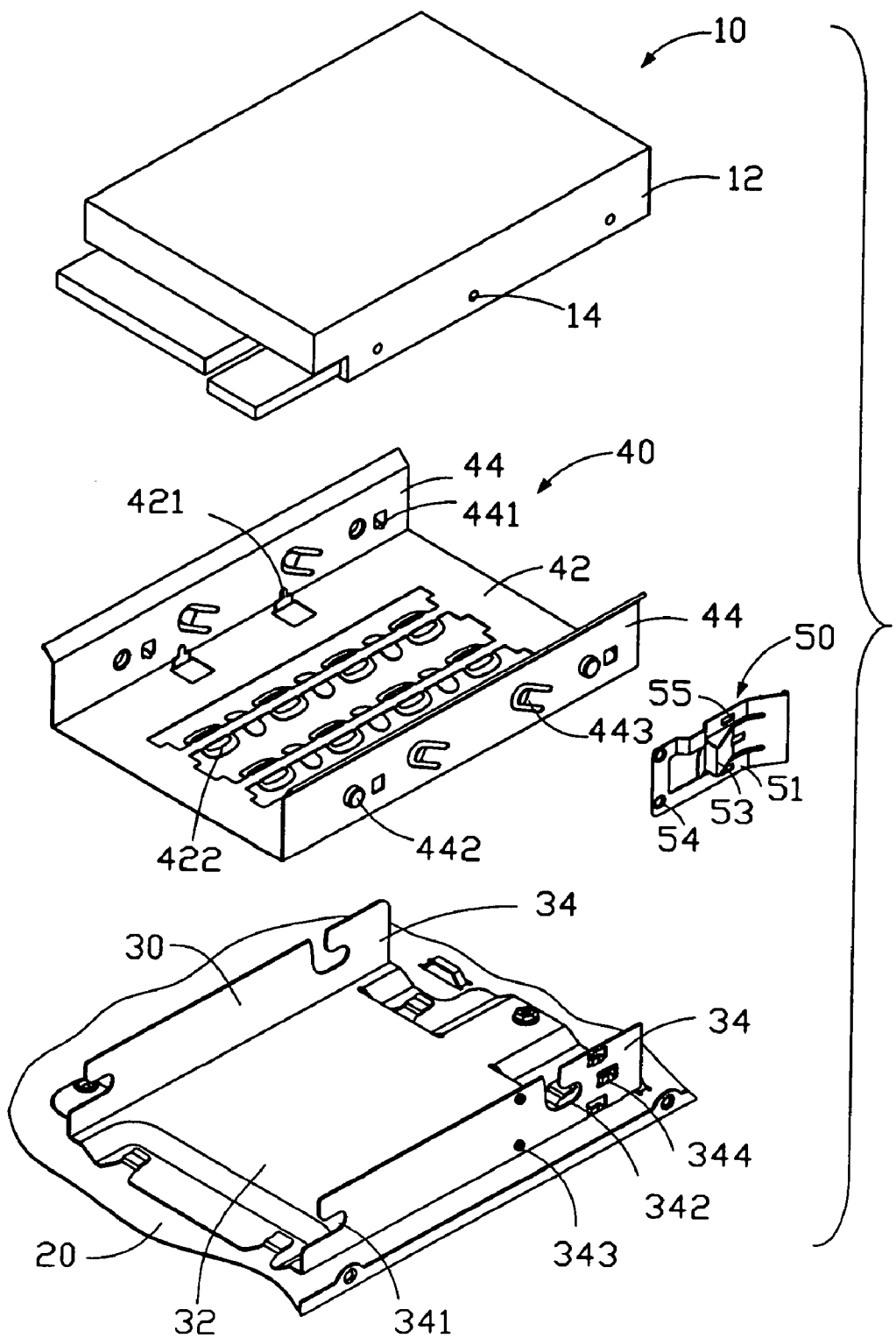
FIG. 1 is an exploded, isometric view of a mounting apparatus in accordance with the present invention, together with a data storage device.

Referring to FIG. 1, a mounting apparatus in accordance with the preferred embodiment of the present invention is used for securing a data storage device 10 to a bottom panel 20 of a computer chassis (not shown). The mounting apparatus comprises a drive bracket 30, a support bracket 40, and a latch 50.

The data storage device 10 comprises a pair of side facets 12 each defining a plurality of apertures 14.

The drive bracket 30 is attached to the bottom panel 20 of the computer chassis by conventional means. The drive bracket 30 comprises a bottom wall 32 and a pair of side walls 34 extending upwardly from opposite sides of the bottom wall 32. The side walls 34 each define a first guiding slot 341 and a second guiding slot 342. The guiding slots 341, 342 communicate with top edges of the side walls 34 via entries. In the preferred embodiment, each first guiding slot 341 also communicates with an end of the corresponding side wall 34. A plurality of L-shaped catches 344 is stamped outwardly from one side wall 34. A pair of protrusions 343 is formed outwardly from said one side wall 34. The second slot 342 is located between the catches 344 and the protrusions 343.

The support bracket 40 comprises a base 42, and a pair of opposite side plates 44 extending upwardly from the bottom panel 42. The base 42 and the side plates 44 cooperatively define a space for receiving the data storage device 10. A plurality of first positioning tabs 421 is stamped upwardly from the base 42 adjacent the side plates 44, for extending into positioning apertures (not visible) of a bottom of the data storage device 10. A plurality of second positioning tabs 441 is stamped inwardly from the side plates 44, for extending into the apertures 14 of the data storage device 10. Two pins 442 extend outwardly from each side plate 44, corresponding respectively to the first and second guiding slots 341, 342 of the drive bracket 30. A plurality of resilient tongues 443 is formed in each side plate 44 by stamping.

Each tongues 443 has a flared end for abutting against the side walls 34 of the drive bracket 30. A plurality of strips 422 slightly extends downwardly from the base 42. The tongues 443 and the strips 422 are configured for better grounding and anti-vibration.

Figure 2:
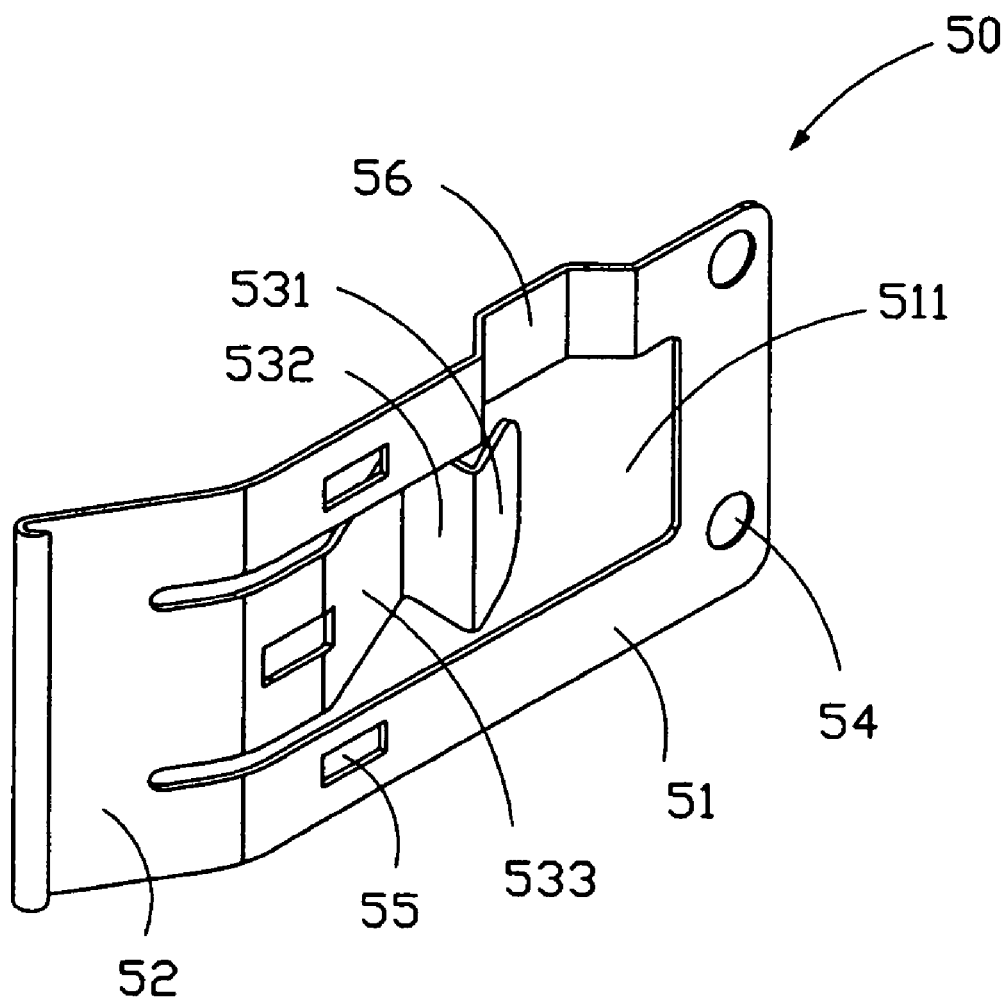
FIG. 2 is an enlarged isometric view of a latch of the amounting apparatus of FIG. 1.

Referring also to FIG. 2, the latch 50 is integrally made by stamping a metal sheet. The latch 50 comprises a main body 51, a handle 52 extending slantingly outwardly from an end of the main body 51, and a resilient multi-bent fastening portion 53 extending away from the handle 52. The main body 51 defines an opening 511 therein. The fastening portion 53 extends from said end of the main body 51 into the opening 511. The main body 51 defines a pair of through holes 54 at the other end thereof, corresponding to the projections 343 of the drive bracket 30. A plurality of fixing holes 55 is defined in the latch 50, corresponding to the catches 344 of the drive bracket 34. A ridge 56 is stamped outwardly from an upper side of the main body 51 corresponding to an entry of the second slot 342. The fastening portion is generally Z-shaped, and comprises a slanted guiding section 531, a limiting section 532 connected to the guiding section 532, and a connecting section 533 connecting the limiting section 532 with said end of the main body 51. The limiting section 532 is generally vertical to the main body 51.

Figure 3:
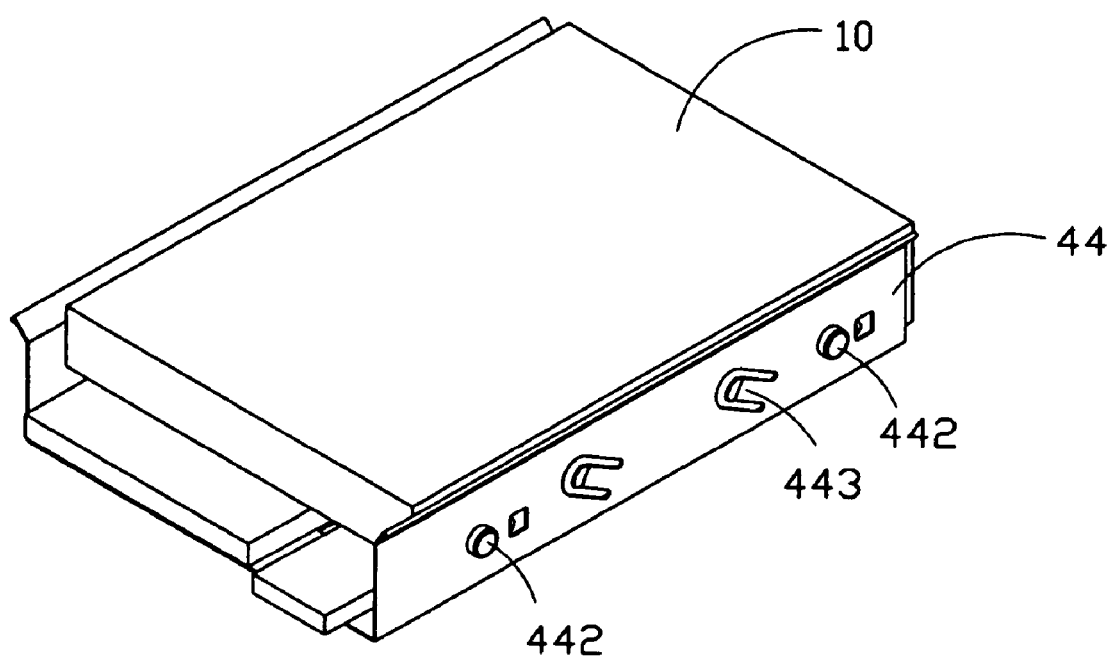
FIG. 3 a pre-assembled view showing a support bracket of FIG. 1 containing the data storage device.

Referring also to FIG. 3, the data storage device 10 is received in the support bracket 30 with the first and second positioning tabs 421, 441 engaging respectively in the positioning apertures (not visible) and the aperture 14.

Figure 4:
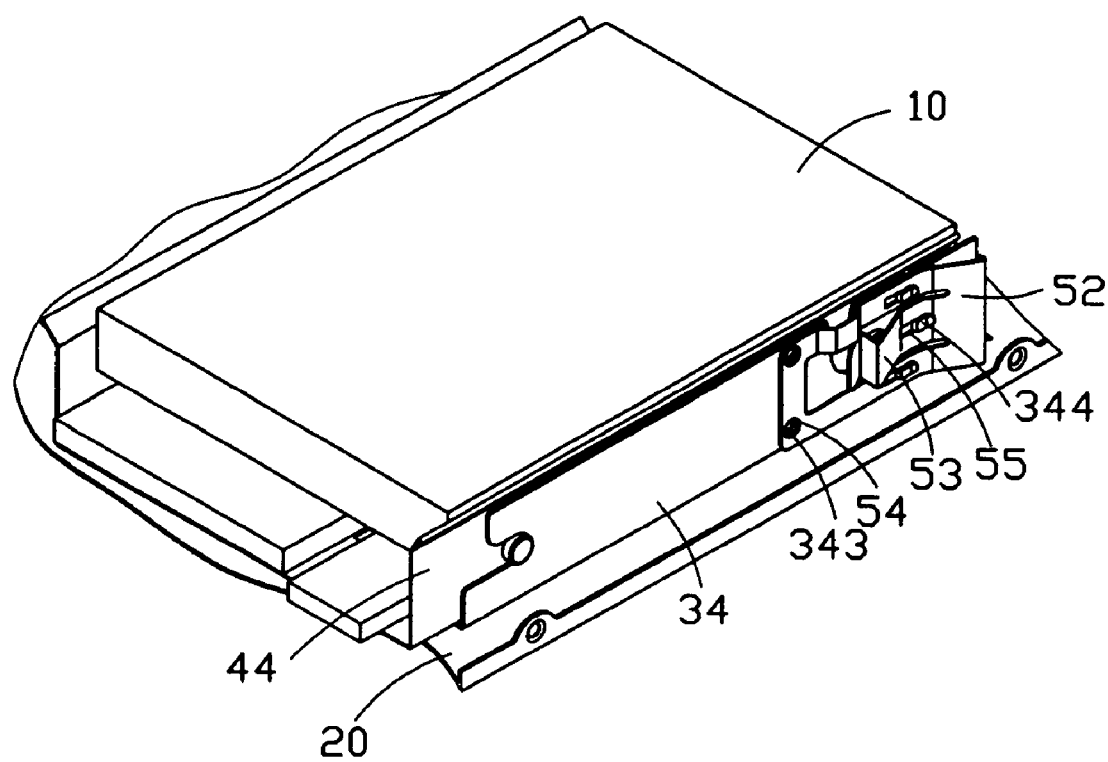
FIG. 4 is an assembled view of FIG. 1.

Referring also to FIG. 4, in attaching the latch 50 to the side wall 34 of the drive bracket 30, the catches 344 of side wall 34 are engaged in the corresponding fixing holes 55 of the latch 50. The latch 50 is moved slightly toward the projections 343. The projections 343 extend into the through holes 54 of the latches 50, and are fixed in the through holes 54 by conventional means such as riveting or fastening. The latch 50 is thus attached to the drive bracket 30. In this position, the ridge 56 of the latch 50 is aligned with the entry of the second slot 342 of the drive bracket 30, for giving way to a corresponding pin 442 of the support bracket 40.

Then, the pins 442 are respectively slid in the corresponding first and second slots 341, 342 via the entries. By the support bracket 40 being further pushed, one of the leading pins 442 rides over the guiding section 531 of the fastening portion 53 of the latch 50 to be limited in a space defined by the limiting section 532 and the connecting section 533 of the latch 50. The combined data storage device 10 and support bracket 40 is thus secured to the drive bracket 30 attached to the bottom panel 20 of the computer chassis.

In disassembly, the handle 52 of the latch 50 is pressed toward the side plate 34 to cause the fastening portion 53 to pivot slightly outwardly, so that the pin 442 is released from the limiting section 532 of the latch 50. The combined data storage device 10 and support bracket 40 can be removed from the drive bracket 30.

In an alternative embodiment of the present invention, more than one latch 50 is attached to the side walls 34 to restrict the pins 442. In a further alternative embodiment of the present invention, the support bracket 40 is omitted. Instead, opposite side facets 12 of the data storage device 10 are provided with a plurality of threaded holes. A plurality of pins 54 each has a threaded end engaged in a corresponding threaded hole of the data storage device 10.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A drive bracket for accommodating a device which having a plurality of pins extending outwardly from opposite side plates thereof, the bracket comprising:
    a bottom wall and first and second side walls extending from the bottom wall, each of the side walls defining a slot therein, the slot defining an entry communicating with a top edge of a corresponding side wall, a plurality of first locking means formed at the first side wall; and
    a latch attached to the first side wall and adapted to secure the device into the bracket, the latch comprising a plurality of second locking means to engage with the first locking means, a handle, and a resilient fastening portion corresponding to the slot of the first side wall, the fastening portion comprising a slanted guiding section and a limiting section;
    wherein the device is placed in the drive bracket with the pins of the device sliding into the slots via the entries, then the pins slide along the slots with one of the pins riding over the guiding section of the fastening portion, and is limited by the limiting section;
    wherein when the handle is pressed, the fastening portion is releasable from the said one of the pins of the device.

2. The drive bracket as described in claim 1, wherein the device comprises a support bracket for accommodating a data storage device, the pins extend from opposite side plates of the support bracket.

3. The drive bracket as described in claim 1, wherein the first locking means comprises a plurality of L-shaped catches extending outwardly from the first side wall, and at least one protrusion formed from the first side wall, and wherein the slot of the first wall is located between the catches and the at least one protrusion.

4. The drive bracket as described in claim 1, wherein the fastening portion of the latch comprises connecting section extending from the handle, the limiting section extends from the connecting section and is generally vertical to a main body of the latch, the guiding section extends slantingly from limiting section, and wherein the fastening portion generally has a Z shape.

5. The drive bracket as described in claim 1, wherein a ridge is outwardly formed from an upper portion of the latch, the ridge is in alignment with the entry of the slot of the first side wall to give way to said one of the pins.

6. The drive bracket as described in claim 2, wherein a plurality of positioning members is formed at a base and the side plates of the support bracket to engage with the data storage device, therefore securing the data storage device into the support bracket.

7. The drive bracket as described in claim 2, wherein a plurality of resilient grounding members is formed at a base and the side plates of the support bracket to contact the bottom wall and first and second side walls, for electronic grounding and anti-vibration.

8. The drive bracket as described in claim 3, wherein the second locking means comprises a plurality of through holes engagingly receiving the catches and the at least one protrusions of the first locking means.

9. A mounting apparatus adapted for attaching a data storage device to a computer chassis, the mounting apparatus comprising:
    a first bracket comprising a bottom wall and a pair of side walls extending therefrom, the side walls defining a plurality of slots therein;

a second bracket comprising a base and a pair of side plates extending therefrom which cooperate to define a space for receiving the data storage device, a plurality of pins extending outwardly from the side plates for slideably engaging in the slots of the first bracket, a plurality of positioning devices formed at the second bracket for engaging with the data storage device, a plurality of resilient members formed at the second bracket for abutting the first bracket; and a latch attached to one of the side walls of the first bracket, the latch comprising a main body and a fastening portion formed from the main body, the fattening portion and a corresponding slot cooperatively defining a space for fastening the pin therein.

10. The mounting apparatus as described in claim 9, wherein a plurality of projections and L-shaped catches are formed outwardly from said one of the side walls of the first bracket, and configured at two sides of the corresponding slot.

11. The mounting apparatus as described in claim 9, wherein the slots of the first bracket each have an entry communicating with a top edge of a corresponding side wall.

12. The mounting apparatus as described in claim 9, wherein the resilient members comprise a plurality of tongues each having a flared end for abutting against the side walls of the first bracket, and a plurality of strips extending slantingly downwardly from the base, the tongues and the strips are for grounding and anti-vibration.

13. The mounting apparatus as described in claim 9, wherein the latch further comprises a handle extending slantingly outwardly from the main body, and wherein when pushing the handle, the fastening portion will be moved to release the corresponding pin.

14. The mounting apparatus as described in claim 9, wherein the fastening portion of the latch is generally Z-shaped, and comprises a slanted guiding section, a limiting section connecting with the guiding section and a slant connecting section connecting the limiting section with the main body.

15. The mounting apparatus as described in claim 10, wherein the latch defines a plurality of through holes and fixing holes for respectively engaging with the projections and catches of the first bracket.

16. The mounting apparatus as described in claim 11, wherein a ledge is formed outwardly from an upper portion of the main body of the latch in alignment with the entry of the corresponding slot for giving way to the corresponding pin.

17. A drive bracket assembly comprising:

a data storage device;

a support bracket defining a receiving cavity retainably receiving said data storage device therein, said support bracket including:

a bottom wall and first and second side walls extending from the bottom wall, means for resiliently supporting the data storage device formed on an interior surface of the support bracket, and a first engagement device formed on an exterior; and a drive bracket defining a receiving cavity retainably receiving said support bracket therein, said drive bracket including a bottom face and first and second side faces extending from the bottom face, a second engagement device and a releasable latching device formed on the at least one of said side faces; wherein the support bracket with the associated data storage device are commonly assembled to the drive bracket to have the first and second engagement devices engaged with each other, and the latching device prevents disengagement between the first and second engagement device unless released.

* * * * *